US007279209B2

(12) United States Patent
Masuda et al.

(10) Patent No.: US 7,279,209 B2
(45) Date of Patent: Oct. 9, 2007

(54) RUNNABLE SPLICE

(75) Inventors: Tsuyoshi Masuda, Duluth, GA (US); Steve N. Tran, Tustin, CA (US); Wei-Young Wu, Diamond Bar, CA (US)

(73) Assignee: Ricoh Electronics, Inc., Santa Ana, CA (US)

( * ) Notice: Subject to any disclaimer, the term of this patent is extended or adjusted under 35 U.S.C. 154(b) by 229 days.

(21) Appl. No.: 10/728,712

(22) Filed: Dec. 5, 2003

(65) Prior Publication Data

US 2005/0123706 A1 Jun. 9, 2005

(51) Int. Cl.
*B32B 9/00* (2006.01)
*B32B 33/00* (2006.01)
*B31F 5/00* (2006.01)

(52) U.S. Cl. .................. 428/40.1; 428/40.1; 428/41.8; 428/53; 428/189; 156/159; 156/266

(58) Field of Classification Search .............. 428/40.1, 428/42.3, 156, 41.8, 61, 211.1; 156/304.4, 156/159, 266
See application file for complete search history.

(56) References Cited

U.S. PATENT DOCUMENTS 3,135,642 A 6/1964 Ruffer
3,573,146 A 3/1971 Guinan et al.
4,009,065 A 2/1977 Mikulas
4,257,837 A 3/1981 Lucas
4,633,276 A * 12/1986 Shibata et al. .............. 503/209
5,141,914 A * 8/1992 Kang ......................... 503/226
5,312,668 A 5/1994 Brown
5,320,698 A 6/1994 Fournier et al.
5,348,793 A 9/1994 Stettner
5,472,755 A * 12/1995 Nibling, Jr. ................ 428/40.5
5,530,517 A * 6/1996 Patton et al. .......... 235/462.05
5,783,010 A * 7/1998 Fisher et al. ................ 156/159
6,033,751 A 3/2000 Kline
6,355,128 B1 3/2002 Eronen
6,797,333 B2 * 9/2004 Haase et al. ................ 427/515

* cited by examiner

*Primary Examiner*—Patricia L. Nordmeyer
(74) *Attorney, Agent, or Firm*—Walter A. Hackler

(57) ABSTRACT

A runnable splice includes a first and second thermal imprintable label stocks adhered to first and second liners and disposed in a manner establishing a splice gap. A third thermal printable paper is disposed over the gap on one side of the runnable splice and a splice tape is provided on an opposite side of the runnable splice.

9 Claims, 1 Drawing Sheet

RUNNABLE SPLICE

The present invention generally relates to pressure sensitive adhesive labels and more particularly directed to an improved splice for joining ends of the thermal imprintable label stock to provide rolls of labels containing the improved splices.

The types of splices utilized in joining label stock are generally either a butt or an overlap joint. In the butt joint, two butt ends of label stock are placed adjacent to one another and a strip of tape is placed over the label joint abutment. This type of splice has proven inefficient since the splice permits the cut ends of the tape to pull apart with adhesive flowing therein to which may cause delamination. In addition, the tape applied over the butt joint has heretofore not been receptive to printing, thereby causing unusable labels.

With the overlap splice, one of the cut ends slightly overlaps the other cut end and strip of tape is placed across the under side of the junction line of the cut ends.

Unfortunately, this type of overlap spliced is thick. When the tape is to be subjected to subsequent converting operations, machine misalignment and misprinting may occur.

The present invention provides for a runnable splice for thermal imprintable label stock, which enables converting and printing with acceptable print to contrast signal.

SUMMARY OF THE INVENTION

A runnable splice in accordance with the present invention generally includes a first thermal imprintable label stock having a first face layer of thermal paper removably adhered to a first silicone liner by a first adhesive. The first thermal label stock includes a first end disposed transversed to a length of the first thermal label stock.

A second thermal label imprintable label stock is provided having a second face layer of thermal paper removably adhered to a second silicone liner by a second adhesive. The second thermal labor stock includes a second end disposed transverse to a length of the second layer label stock. The first and second ends are disposed in a parallel spaced apart relationship to form a splice gap there between.

A third thermal imprintable label is disposed over the splice gap and adhered to both the first and second face layers for enabling thermal printing over the splice gap.

In addition, a splice tape is disposed over the spliced gap and adhered to both the first and second silicone liners. The adhesion of the splice tape to the silicone liner enables removal of the liner from the face layer without separation of the liners from one another.

More specifically, the runnable splice in accordance with the present invention includes a splice gap which includes a width of between about 0 inches and about 0.125 inches and the third thermal label has a width of between about 0.5 inches and about 3 inches.

In order to improve the length of the splice and accordingly the overall strength thereof, the splice gap is disposed at an angle between about 0° and about 40° transverse to a longitudinal axis of the first and second thermal label stock.

Further, the first face layer and the second face layer are adhered to the first and second silicone liners respectively with a pressure sensitive adhesive and in one embodiment the silicone liner and the splice tape are also printable.

More particularly, the splice tape has a width of between about 1 inch and about 3 inches.

BRIEF DESCRIPTION OF THE DRAWINGS

The advantages and features of the present invention would be better understood by the following description when considered in conjunction with the accompanying drawings in which.

DETAILED DESCRIPTION

Figure 1:
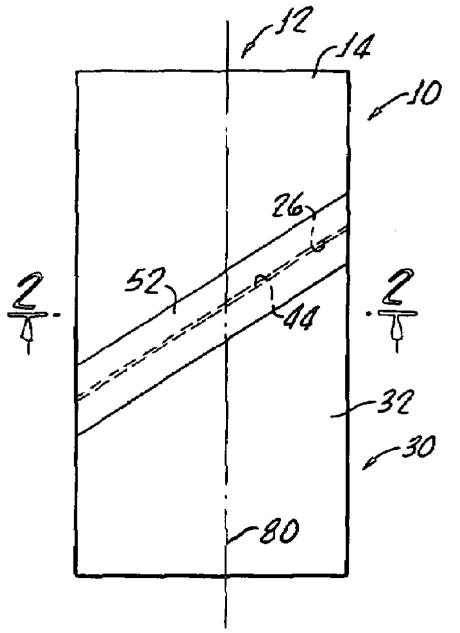
FIG. 1 is a plan view of a runnable splice in accordance with the present invention generally showing a first and second thermal printable label stock with a third thermal imprintable label disposed over a spliced gap, shown in dashed lines.
Figure 2:
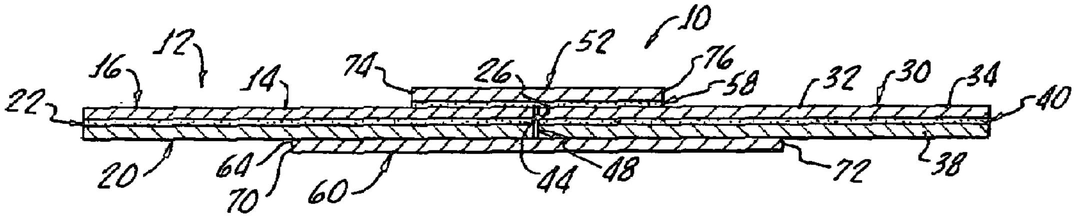
FIG. 2 is a cross-sectional view of the runnable splice shown in the FIG. 1 taken along the line 2-2.
Figure 3:
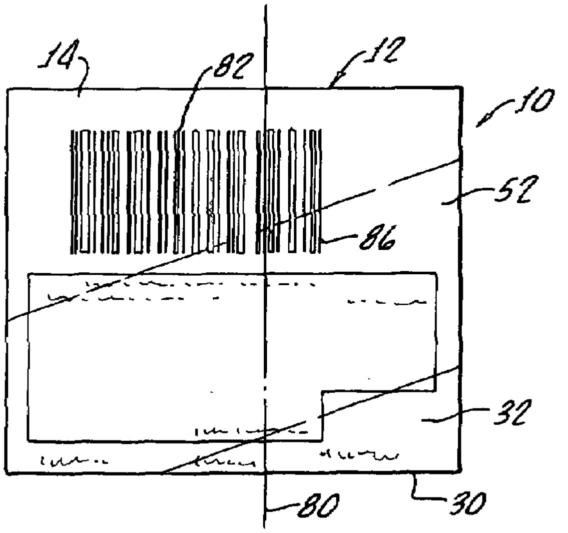
FIG. 3 is a plan view of a converted label with a bar code thermally imprinted upon the first, second and third thermal imprintable label stock.

With reference to FIGS. 1, 2, and 3, there is shown a runnable splice 10 generally including a first thermal imprintable label stock 12 having the first face layer 14 of thermal paper 16 removably adhered to a first silicone liner 20 by a first adhesive 22, the first label stock 16 having an end 26 disposed transverse to a length of the first thermal label stock 16.

A second thermal imprintable label stock 30 includes a second face layer 32 of thermal paper 34 adhered to a second silicone liner 38 by a second adhesive 40. A second end 44 is disposed transversed to a length of the second thermal label stock 30 and the first and second ends 26, 44 are disposed in a parallel spaced apart relationship to form a splice gap 48 therebetween.

A third thermal imprintable label 52 is disposed over the splice gap 48 and adhered to both the first and second phase layers 14, 30 by an adhesive 58.

A splice tape 60 is disposed over the splice gap 48 and an adhesive 64 adheres the splice tape 60 to both the first and second silicone liners 20, 38 and enables the removal of the liners 20, 38 from the face layers 14, 32 without separation of the liners 20, 38. The splice tape 60 may be repulpable or non-repulpable and printable or non-printable.

Although not specifically shown, the first and second thermal imprintable label stocks 14, 30 utilize a thermal sensitive coloring material comprising a colorless or light-colored leuco dye and an acidic substance capable of causing the leuco dye to undergo color formation upon heating of the thermal sensitive recording label.

While not specifically shown, the stocks 12, 30 include a layer of thermal sensitive coloring material disposed on the substrate and a thermal head printer thereafter used to contact and heat specific areas of the layer to cause color-formation in the areas heated, while the remainder of the layers stays colorless, or light-colored, thereby producing visible alpha numeric characters in the layer such as barcodes, as shown in FIG. 3.

Thermal sensitive paper stock discussed in U.S. Pat. Nos. 4,577,204; 4,633,276; 4,851,383; 4,724,002; 4,707,211; 4,898,848; 5,244,859; 5,508,247.

All of these patents are to be incorporated herewith by this specific reference thereto in order to describe the paper stock 12, 30, 52 suitable for use with the present invention.

Normally but not necessarily, the first, second and third thermal label stocks 12, 30, 52 in the splice are the same (including Face, Adhesive and Silicone Liner, respectively).

The adhesives 22, 40, 58 are preferably pressure sensitive of any suitable type in particular one selected from a group consisting of thermoplastic styrene-butadiene rubber hot melt adhesive and acrylic adhesives.

The adhesive 64 may be any suitable type of hot melt, rubber base, heat activated or acrylic adhesive.

Normally but not necessarily, the splice tape 60 has a greater width than the third thermal label 52 in order to insure bonding between the label 52 and the face layers 14, 32 upon removal of the liners 20, 38 from the papers 16, 34. That is, because ends 70, 72 of the splice tape 60 are not aligned with ends 74, 76 of the label 52 less stress is produced between the label 52 and the papers 16, 34 during the removal operation.

In addition, the splice gap 48 may have a width of between about 0 and about 0.125 inches and the third thermal label 52 may have a width of between about 1 and about 2 inches. To further increase strength, the splice gap 48 and label 52 and splice tape 60 are disposed at a transverse angle of between about 0° about 40° to a longitudinal axis 80 of the first and second thermal label stock 12, 30, as shown in FIG. 1.

Preferable, the splice 10 has a liner opacity of between about 10% to about 60% at 880 nm in order to facilitate notification to operation of the location of the splice during conversion of the labels.

After thermal imprint of the runnable splice, as shown in FIG. 3, a barcode 82 can be read with acceptable print contrast signal except where portions of overlap exist. Accordingly, as the barcode 82 is read transverse to the longitudinal axis 80 sufficient print contrasts signal is established throughout the runnable splice 10.

In one embodiment the liners 20, 38 as well as the splice tape 60 may be printable in order to enable indicia to be provided on and under the runnable splice 10.

With the use of the adhesives hereinabove set forth, the rupture strengths of the runnable seal 10 are as follows: between 15 to 100 lb-*f*/inch.

Although there has been hereinabove described a specific running splice in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element, which is not specifically disclosed herein. Accordingly, any and all modifications, variations or equivalent arrangements, which may occur to those skilled in the art, should be considered to be within the scope of the present invention as defined in the appended claims.

What is claimed is:

1. A runnable splice comprising:

a first thermal imprintable label stock having a first face layer of thermal sensitive paper removably adhered to a first silicone liner by a first adhesive, the first thermal label stock having a first end disposed transverse to a length of the first thermal label stock;

a second thermal imprintable label stock having a second face layer of thermal sensitive paper removably adhered to a second silicone liner by a second adhesive, the second thermal label stock having a second end disposed transverse to a length of the second thermal label stock, the first and second ends being disposed in a parallel spaced apart relationship to form a splice gap therebetween;

a third thermal imprintable label disposed over said splice gap and adhered to both the first and second face layers for enabling thermal printing over said splice gap; and a splice tape disposed over said splice gap and adhered to both the first and second silicone liners, the adhesive of said splice tape to the silicone liner enabling removal of the liners from the face layers without separation of the liners from one another, said splice tape having a width greater than said third imprintable label in order to insure bonding between the third imprintable label and the first and second layers.

2. The runnable splice according to claim 1 wherein said splice gap has a width of between about 0 inches and about 0.125 inches and said third thermal label has a width of between about 0.5 inches and about 3 inches.

3. The runnable splice according to claim 2 wherein said splice gap is disposed at an angle of between about 0° degrees and about 40 degrees transverse to a longitudinal axis of the first and second thermal label stock.

4. The runnable splice according to claim 3 wherein the first face layer and second face layer are adhered to the first and second silicone liners respectively with a pressure sensitive adhesive.

5. The runnable splice according to claim 4 where the silicone liner and splice tape are thermal imprintable.

6. A runnable splice comprising:

a first thermal imprintable label stock having a first face layer of thermal sensitive paper, a first liner and a pressure sensitive adhesive disposed therebetween, the first thermal label stock having a first end disposed transverse to a length of the first thermal label stock;

a second thermal imprintable label stock having a second face layer of thermal sensitive paper, a second liner and a pressure sensitive adhesive disposed therebetween, the second thermal label stock having a second end disposed transverse to a length of the second thermal label stock, the first and second ends being disposed in a parallel spaced apart relationship to form a splice gap therebetween;

a third thermal imprintable label disposed over said splice gap and adhered to both the first and second face layers for enabling thermal printing over said splice gap; and a splice tape disposed over said splice gap and adhered to both the first and second liners, the adherence of said splice tape to the silicone liner enabling removal of the liners from the face layer without separating the liners from one another, said splice tape having a width greater than said third imprintable label in order to insure bonding between the third imprintable label and the first and second layers.

7. The runnable splice according to claim 6 wherein said splice gap has a width of between about 0 inches and about 0.125 inches and said third thermal label has a width of between about 0.5 inches and about 3 inches.

8. The runnable splice according to claim 7 wherein said splice gap is disposed at an angle of between about 10 degrees and about 40 degrees transverse to a longitudinal axis of the first and second thermal label stock.

9. The runnable splice according to claim 8 where the silicone liner and splice tape are thermal imprintable.

* * * * *